United States Patent [19]

Go

[11] 4,330,661

[45] * May 18, 1982

[54] COPOLYESTERS, METHOD OF MAKING SAME AND PACKAGING MATERIALS

[75] Inventor: Santos W. Go, Toledo, Ohio

[73] Assignee: Owens-Illinois, Inc., Toledo, Ohio

[*] Notice: The portion of the term of this patent subsequent to Apr. 1, 1997, has been disclaimed.

[21] Appl. No.: 119,895

[22] Filed: Feb. 8, 1980

[51] Int. Cl.³ .............................................. C08G 63/18
[52] U.S. Cl. ..................................................... 528/173
[58] Field of Search ............................................ 528/173

[56] References Cited

U.S. PATENT DOCUMENTS

| | | | |
|---|---|---|---|
| 4,145,517 | 3/1979 | Go | 528/173 |
| 4,188,357 | 2/1980 | Go | 528/173 |
| 4,196,275 | 4/1980 | Go | 528/173 |

*Primary Examiner*—Maurice J. Welsh
*Attorney, Agent, or Firm*—Charles S. Lynch; Myron E. Click; David H. Wilson

[57] ABSTRACT

Disclosed are copolyesters based on terephthalic acid, ethylene glycol and bis (4-β-hydroxyethoxyphenyl) sulfone made by solid state polycondensation of a lower molecular weight polymer thereof, a process for making same, and containers, packages and packaging materials made therefrom. The copolyesters have low acetaldehyde content.

11 Claims, No Drawings

COPOLYESTERS, METHOD OF MAKING SAME AND PACKAGING MATERIALS

Poly(ethylene terephthalate) resins are excellent molding compounds for making packages and packaging materials. In one important application such packaging materials and packages, such as bottles or packaging film are used to package comestibles intended for human consumption, wherein the resin comes in direct contact with the food or beverage product packaged. In recent years it has become increasingly apparent that a disadvantage of using such resins in the packaging of comestibles is that in forming the packaging materials or packages, such as film or a container or bottle, some thermal degradation of the product takes place, resulting in some cases in discoloration. More importantly, it has become apparent that an important product of such decomposition are aldehydes such as acetaldehyde which affects the flavor of some food products such as beverages and, moreover, because of the presence of acetaldehyde therein, such beverages or foodstuffs may be considered to be unfit for human consumption by governmental regulatory bodies. The foregoing is recognized in U.S. Pat. No. 4,064,112.

Various methods have been proposed to regulate the polymerization process and the handling of the resulting resins to minimize the formation and presence of acetaldehyde in the final packaging material or container. For instance, in the aforementioned U.S. patent it is stated that it is known to produce the high viscosity polyesters by solid state polycondensation under an inert gas blanket or vacuum, and it is implied that this aids in minimizng the decomposition and the formation of aldehydes.

Present commercial methods for producing poly(ethylene terephthalate) resins of a suitable viscosity for molding produces polymers that are low enough in acetaldehyde content to satisfy standards for packaging of beverages in large bottles. However, improvement in the acetaldehyde content of such polymers is desired for making beverage bottles of smaller size such as 6½ and 8 oz. sizes, since the ratio of surface area of the bottle walls to the volume of the bottle is much larger than in large bottles, such as for instance quart bottles. Improvement is desired also in other applications of such packaging resins for packaging foodstuffs and beverages and other comestibles.

It is an object of the present invention to provide containers and packaging materials for packaging comestibles such as foodstuffs and liquid beverages made of polyesters based on terephthalic acid wherein the decomposition products, specifically acetaldehyde, can be controlled to a lower value than in packaging materials and containers made from poly(ethylene terephthalate).

It is a further object of the present invention to provide new copolyester resins based on terephthalic acid or its $C_1$-$C_4$ alkyl esters, ethylene glycol and bis(4-$\beta$-hydroxyethoxyphenyl)sulfone with increased thermal stability.

It is another object of the invention to provide a process for making new copolyesters from terephthalic acid or its $C_1$-$C_4$ alkyl esters, ethylene glycol and bis(4-$\beta$-hydroxyethoxyphenyl)sulfone so as to obtain a copolyester of low acetaldehyde content, but also more importantly to obtain a polyester that generates much less acetaldehyde on heating at temperatures normally used for extrusion in the process of forming a packaging material or container. Thus, extrusion of polyesters to make sheet or film, or the free extrusion of a parison or preform or the extrusion by injection molding of a preform to make a container by subsequent blow molding, involves temperatures well above the melting point temperature. A further object, of course, is to provide such a container or packaging material which is a product of such method.

Other objects, as well as aspects and advantages, of the invention will become apparent from a study of this specification.

According to one aspect of my invention there is provided a thermoplastic copolyester, having an inherent viscosity of over 0.65 dl/gm, a Tg of at least 82° C. and a melting point peak of at least 220° C., which is the solid state polycondensation reaction product of a thermoplastic copolyester which is the polymeric reaction product of reactants consisting essentially of (A) reactant(s) selected from terephthalic acid and its $C_1$ to $C_4$ alkyl esters, with (B) reactants, bis(4-$\beta$-hydroxyethoxyphenyl)sulfone and ethylene glycol, wherein the amount of said bis(4-$\beta$-hydroxyethoxyphenyl)sulfone is 2–12 mol percent of the amount A of reactant(s), the combined amount of B reactants is about 110 to 300 mol percent of the amount of A reactants(s), prepared by melt polymerization to yield a copolyester having a lower inherent viscosity which is in the range 0.2 to 0.7 dl/gm., said solid state copolyester being more resistant to decomposition in the molten state to form acetaldehyde than (1) the same copolyester of the same or lower inherent viscosity but made entirely by polymerization and condensation in the molten state or (2) poly(ethylene terephthalate) made by solid state polycondensation or by melt polymerization.

In another important aspect of the present invention there are provided plastic containers made by melt forming the described improved copolymers of the present invention.

I have discovered that my copolyesters made with 2–12 percent charged bis(4-$\beta$-hydroxyethoxyphenyl)sulfone (herein called BSE) can be made having a crystalline melting point of at least about 220° C., or 221° C., and that such polymers can be crystallized to contain sufficient crystallinity to permit solid state reaction to a higher molecular weight, while higher percentages of BSE yield polymers of lower crystallinity and lower melting point, or with no tendency to crystallize. As a consequence, no practical method can be devised to produce copolyesters by solid state polycondensation where such copolyesters contain much over 12 percent BSE. Thus, the polymer cannot be maintained in particulate form during polycondensation because it cannot adequately be crystallized. Therefore, if a nonparticulate mass is heated for polycondensation the reaction would scarcely proceed because of the inability of the ethylene glycol to diffuse to the surface of the mass to be withdrawn from the reaction zone.

I have further discovered that copolyesters having the percentages of BSE recited herein are intrinsically very much more thermally stable at working temperatures above their DSC melting points when solid stated according to the present invention than (1) when made by melt polymerization alone or (2) poly(ethylene terephthalate).

While the prior art has melt polymerized, crystallized poly(ethylene terephthalate) while flushing with nitrogen, then the crystalline prepolymer is heated to effect polycondensation in the solid state below its melting temperature such polymers are intrinsically less stable at working temperatures above their melting points and contain more acetaldehyde after extrusion to form film, sheet or containers.

Furthermore, I have discovered that inclusion of 2-12 percent BSE lowers the melting point and this further minimizes the decomposition products, such as acetaldehyde, in containers and packaging materials such as film and sheet because a lower extrusion temperature can be employed since the melting point is lower than poly(ethylene terephthalate) having no such additive.

According to another aspect of the present invention there is provided a process for making a thermoplastic copolyester which is intrinsically more stable than poly(ethylene terephthalate) toward decomposition to form unwanted products such as acetaldehyde, which comprises (1) melt polymerizing reactants consisting essentially of
  (A) reactant(s) selected from terephthalic acid and its $C_1$ to $C_4$ alkyl esters with
  (B) reactants, bis(4-β-hydroxyethoxyphenyl)sulfone and ethylene glycol,
wherein the amount of said bis(4-β-hydroxyethoxyphenyl)sulfone is 2-12 mol percent of the amount A of reactant(s), and the combined amount of B reactants is about 110 to 300 mol percent of the amount of A reactant(s), until the polymeric reaction product has an inherent viscosity of 0.2 to 0.7 dl/gm., (2) cooling the copolyester from step (1) to a solid state, reducing it to particulate form and heat crystallizing the particulate copolyester, and (3) effecting solid state reaction of said particulate copolyester by polycondensation thereof, in a temperature range from 180° C. to just below the temperature of the onset of melting as indicated by a thermogram determined using a differential scanning calorimeter, to a higher inherent viscosity than the product of step (1), said higher viscosity being at least 0.65 dl/gm.

In the crystallization step the particulate copolyester is typically flushed with a dry gas such as nitrogen during this step, as is customary.

In the solid state polymerization step the flushing gas can be nitrogen, $CO_2$, or other inert gases, or a vacuum can be used. If desired, a partial vacuum can be used in conjunction with a flow of one of the foregoing purge gases.

In the foregoing process of my invention the highest temperature employed in the melt polymerization step is usually not over 280° C., preferably not over 275° C., but is usually at least 260° C.

The crystallization step is usually effected mainly in the temperature range 120° to 180° C. If the temperature is too low, the crystallization rate will be impracticably slow; if too high trouble with sticking and agglomeration is encountered. However, during the latter stages of crystallization the crystallization temperature can be above 180° C. without sticking because as crystallization proceeds the sticking temperature becomes higher with the increasing proportion of crystalline polymer contained in the product. Some routine experimentation may be required in a given case if one wants to effect the latter stages of crystallization at the highest possible temperature without encountering sticking.

The lowest temperature for any practicably rapid rate of reaction in the polycondensation step of the present process is about 180° C. This limits the amount of BSE that can be included since much over 12 percent results in a polymer that has so few crystals that it simply sticks and agglomerates when attempting the solid state polycondensation at this temperature. See Example 11. The lower limit of BSE is governed by the fact that lower amounts do not form a polymer much more stable than PET. Compare the acetaldehyde amounts formed at temperatures above the melting point peak for Examples 4 (2%BSE), 6 (1%BSE) and 7 (PET).

The solid state polycondensation step of the invention can be effected from 180° C., as stated, up to the temperature of the onset of melting as indicated by the DSC thermogram. This is the temperature at which the curve first rises slightly above the horizontal toward the melting peak of the thermogram. Reference is made to a typical or schematic thermogram shown in U.S. Pat. No. 3,822,332. The onset of melting for the present products ranges from about 197° C. for 12 percent BSE (Example 5) up to about 224° C. for 2% BSE (Example 4). Onset of melting is 205° C. for 7 percent BSE (Example 2). Usually, the maximum temperature during the solid state reaction step is no more than 5° C. below the onset of melting temperature; this is in order to avoid any question of incipient stickiness leading to agglomeration of the particular polymer. Thus, the solid state polycondensation temperature is always below about 224° C., preferably below about 219° C., based on the 2 percent BSE copolyester, having the highest melting point peak temperature.

From the foregoing discussion of temperature, it will also be apparent that polycondensation can begin during the latter stages of the crystallization step. In other words, the two steps can overlap to a certain extent in a given case.

The foregoing process of the present invention has numerous advantages. Thus, not only is a more stable, improved copolyester produced than in the case of poly(ethylene terephthalate) but several process advantages result. Thus, for a given temperature I have discovered that the rate of increase in molecular weight, as reflected in relative increase in inherent viscosity, is more rapid than in the case of the solid state polymerization (polycondensation) of poly(ethylene terephthalate). This is surprising since the rate of inherent viscosity increase of poly(ethylene terephthalate) and the present copolyester in the molten state are about the same. For instance, compare Examples 12 and 13.

This more rapid reaction in the present system using the co-reactant, BSE, allows the use of lower solid state polymerization temperatures, thus saving in heat energy. Furthermore, use of such lower temperatures helps minimize thermal decomposition, thus minimizing the formation of unwanted decomposition products, such as acetaldehyde in particular. Finally, of course, the present solid stating polycondensation process produces polymers inherently more stable at temperatures exceeding the polymer melting points. Thus, the initial step in forming containers, such as bottles, or packaging materials, such as film or sheet, is a melt forming step wherein the molten copolyester is melt formed by extrusion to make a parison or preform, as the initial step in making a bottle or container, or film or sheet is extruded directly.

When it is stated herein that the reactants "consist essentially of" certain reactants, this means that such reactants are essential, but that the usual other ingredients can be included, such as colorants, inert fillers, polymerization catalysts, cross-linking agents to improve melt strength (see my Belgian Pat. No. 872,792 having an effective date under 35 U.S.C. 102(a) and (b) of Mar. 30, 1979, wherein from 0.1 to 0.7 mol percent of trimellitic acid anhydride is included to increase melt strength). Such other ingredients can be included if they do not deleteriously affect the basic and novel characteristics of the products of my invention or of the process of the present invention, as they are described herein.

In the following examples the various properties were determined as follows:

The inherent viscosities were measured at 25° C., using a solution of 0.25 gms. of polymer dissolved in 100 milliliters of a mixture of 3 weight parts phenol with 2 weight parts 1,1,2,2 tetrachloro-ethane. All polymers of the invention have inherent viscosities of over 0.65 deciliters per gram measured in this manner.

The glass transition temperature, Tg, the melting point temperature, Tm and the crystallization temperature, Tc were determined using a Perkin-Elmer differential scanning calorimeter, model DSC-2, in a manner similar to that described in U.S. Pat. No. 3,822,332 issued July 2, 1974, using a heating rate of 10° C./minute. As is well-known these values are all essentially the same for the prepolymer, the product of the melt polymerization step, as for the final, higher viscosity product of the solid state polycondensation. This is illustrated by comparing the values for Example 4 herein with Example 8 of my Belgian Pat. No. 872,792.

Examples 1-5 are examples of copolyesters and processes within the scope of the invention and each has the combination of properties set forth hereinbefore for copolyester compositions and processes of the invention.

The determination of acetaldehyde generated by the polymers given in the examples and in Table 1 was effected as follows:

A 100 mg ground polymer sample, about 10-40 mesh size, was weighed into a glass test tube. The size of the test tube was 1.1 cm inside diameter and 10 cm long. The content of the glass tube was flushed with nitrogen gas and sealed with a rubber stopper. Then the sealed tube was transferred into a heating block that was maintained at the required temperature (given in the examples). After 5 or 10 minutes, a 1 cc headspace gas sample was taken out from the glass tube and injected into a gas chromatograph and analyzed therein. The gas chromatograph was equipped with a Poropak QS column, ⅛″ O.D.×5′ long. The injection port temperature was at 200° C., column temperature at 165° C. and detector temperature at 220° C.

The residual acetaldehyde in some of the polymers was similarly determined but using a temperature for heating the sampling tube that would de-gas the polymer but would not generate further acetaldehyde. A 300 mg ground polymer sample, about 20 mesh size, was weighed into a glass test tube. The size of the test tube was 1.1 cm inside diameter and 10 cm long. The glass tube was sealed with a rubber stopper. Then the sealed tube was transferred into a heating block that was maintained at 150° C. After 30 minutes, a 1 cc headspace gas sample was taken out from the glass tube and injected into a gas chromatograph and analyzed therein. The gas chromatograph was equipped with a Poropak QS column, ⅛″ O.D.×5′ long. The injection port temperature was at 200° C., column temperature at 165° C. and detector temperature at 220° C.

Examples 1-5 are examples of copolyesters and processes within the scope of the invention and each has the combination of properties set forth hereinbefore for copolyester compositions and processes of the invention.

The crystallization temperature peak, Tc, of copolyester products of the invention ranges from a few degrees above the 135° C. crystallization temperature of PET (Example 7) for 2 percent (Example 4) of the sulfone monomer (BSE) to 184° C. for 10 percent BSE (Example 3) and a few degrees higher for the 12 percent BSE copolyester. The crystallization temperature peak for the copolyesters having 7 percent BSE charged in the copolyester reaction mixture (Examples 1 and 2) is about 155° C.

Table 1 summarizes in tabular form some of the results of some of the examples which follow.

TABLE 1

| | ACETALDEHYDE PPM AT TEMPERATURES ABOVE MELTING POINT TEMPERATURE | | | | | | | | | | | | | | | | | |
|---|---|---|---|---|---|---|---|---|---|---|---|---|---|---|---|---|---|---|
| Example | 5 | | 3 | | 2 | | 1 | | 4 | | 6 | | 7 | | 10 | | 9* | |
| | 12% BSE Tm 221° C. | | 10% BSE Tm 228° C. | | 7% BSE Tm 236° C. | | 7% BSE Tm 236° C. | | 2% BSE Tm 244° C. | | 1% BSE Tm 250° C. | | PET Tm 252° C. | | PET (Zimmer) Tm 252° C. | | 7% BSE Tm 236° C. | |
| | Minutes | | Minutes | | Minutes | | Minutes | | Minutes | | Minutes | | Minutes | | Minutes | | Minutes | |
| Temp. °C. | 5 | 10 | 5 | 10 | 5 | 10 | 5 | 10 | 5 | 10 | 5 | 10 | 5 | 10 | 5 | 10 | 5 | 10 |
| 230 | 0.44 | 1.05 | 0.25 | 0.60 | — | | — | | — | | — | | — | | — | | — | |
| 250 | 0.58 | 1.45 | 0.66 | 1.90 | 0.64 | 1.45 | 0.76 | 2.12 | 1.20 | 4.85 | — | | — | | 2.10 | 5.0 | | |
| 270 | 1.35 | 4.85 | | | 1.65 | 5.95 | | | 3.45 | 8.55 | 9.9 | 23 | 7.95 | 24 | 10.1 | 19.0 | 4.45 | 9.00 |
| TMA¹ | No | | Yes | | No | | Yes | | Yes | | Yes | | No | | No | | Yes | |
| Inherent Viscosity | 0.68 | | 1.04 | | 0.76 | | 1.13 | | 0.75 | | 0.83 | | 0.78 | | 0.78 | | 0.64 | |

*melt polymerization only
¹trimellitic acid anhydride

EXAMPLE 1 (7% BSE)

Into a 1-liter stainless steel reactor equipped with a stirrer, nitrogen gas inlet port and a condenser, the following were added:

| | | |
|---|---|---|
| 388.4 | g | dimethyl terephthalate (DMT) |
| 248.0 | g | ethylene glycol |
| 47.35 | g | bis(4-β-hydroxyethoxyphenyl)sulfone (BSE) |
| 0.7685 | g | trimellitic acid anhydride (TMA) |
| 0.1225 | g | Mn(OAc)$_2$ . 4H$_2$O |

The reaction mixture was heated, under a nitrogen atmosphere (continuously flushing with N$_2$), at 200° C. for 2¾ hours. Methanol was continuously distilled out during this period. Then 0.1458 g of Sb$_2$O$_3$ and 0.082 g of H$_3$PO$_3$ were added to the reactive mixture. The reaction temperature was increased to 250° C. After 1 hour and 35 minutes, the nitrogen gas flow was stopped, and the reaction was continued at 270° C. for 3¼ hours, under less than 0.5 mm Hg vacuum. The copolyester product had an inherent viscosity of 0.64 dl/gm. Its differential scanning calorimeter (DSC) melting peak, Tm was at 236° C., the crystallization temperature peak, Tc, was 155° C., and its glass transition temperature was 90° C.

The product was ground to 10–40 mesh (U.S. Standard Sieve Series) in a Wiley mill. It was then crystallized at 180° C. while flushing with dry nitrogen gas. The crystallized copolyester was subjected to solid state polycondensation at 200° C. for 7 hours residence time under a continuous flow of 700 cc/min of dry nitrogen gas. After the 7 hours reaction time, the product was cooled down to room temperature and it was removed from the solid state reactor. The particulate solid stated copolyester product had an inherent viscosity of 1.13, and a residual acetaldehyde content of 0.18 ppm (weight acetaldehyde/weight polymer). The high molecular weight copolyester was heated at 210° C., 230° C. and 250° C. for 5 minutes and 10 minutes, and the amount of acetaldehyde gas given off (per weight of polymer) was measured in a gas chromatograph. The results were as follows:

| Temperature | Time | ppm of acetaldehyde |
| --- | --- | --- |
| 210° C. | 5 min | 0.16 |
| 230° C. | 5 min | 0.32 |
| 250° C. | 5 min | 0.76 |
| 210° C. | 10 min | 0.28 |
| 230° C. | 10 min | 0.50 |
| 250° C. | 10 min | 2.12 |

Eight ounce narrow necked beverage bottles are made from solid stated product made under the conditions of this example by free extrusion of a tubular parison and blow molding the parison. The bottle walls contain less acetaldehyde than bottles made from PET prepared according to Example 7 herein.

EXAMPLE 2 (7% BSE)

Into a 1-liter stainless steel reactor equipped with a stirrer, nitrogen gas inlet port and a condenser, the following were added:

| 388.4 | g | dimethyl terephthalate |
| --- | --- | --- |
| 248.0 | g | ethylene glycol |
| 47.35 | g | bis(4-β-hydroxyethoxyphenyl)sulfone |
| 0.1225 | g | Mn(OAc$_2$ . 4H$_2$O) |

The reaction mixture was heated, under nitrogen atmosphere, at 200° C. for 2¼ hours. Methanol was continuously distilled off during this period. Then 0.1458 g of Sb$_2$O$_3$ and 0.082 g of H$_3$PO$_3$ were added to the reaction mixture. The reaction temperature was increased to 240° C. After 50 minutes, the nitrogen gas flow was stopped, and the reaction was continued at 262° C. for 3 hours, under less than 0.5 mm Hg vacuum. The copolyester product had an inherent viscosity of 0.54. Tm was 236° C., Tc was 155° C., and Tg was 90° C.

The product was subjected to solid state polycondensation according to Example 1. The solid stated copolyester product had an inherent viscosity of 0.87, and a residual acetaldehyde content of 0.24 ppm. The high molecular weight copolyester was heated at 230° C., 250° C., 270° C. for 5 minutes and 10 minutes, and the amount of acetaldehyde gas given off was measured in a gas chromatograph. The results were as follows:

| Temperature | Time | ppm of acetaldehyde |
| --- | --- | --- |
| 230° C. | 5 min | 0.36 |
| 250° C. | 5 min | 0.64 |
| 270° C. | 5 min | 1.65 |
| 230° C. | 10 min | 0.72 |
| 250° C. | 10 min | 1.45 |
| 270° C. | 10 min | 5.95 |

EXAMPLE 3 (10% BSE)

Into a 1-liter stainless steel reactor equipped with a stirrer, nitrogen gas inlet port and a condenser, the following were added:

| 388.4 | g | dimethyl terephthalate |
| --- | --- | --- |
| 248.0 | g | ethylene glycol |
| 67.64 | g | bis(4-β-hydroxyethoxyphenyl)sulfone |
| 0.7685 | g | trimellitic acid anhydride |
| 0.1225 | g | Mn(OAc)$_2$ . 4H$_2$O |

The reaction mixture was heated, under nitrogen atmosphere, at 200° C. for 3 hours. Methanol was continuously distilled out during this period. The 0.1458 g of Sb$_2$O$_3$ and 0.082 g H$_3$PO$_3$ were added to the reaction mixture. The reaction temperature was increased to 250° C. After one hour, the nitrogen gas flow was stopped, and the reaction was continued at 270° C. for 3¼ hours, under less than 0.5 mm Hg vacuum. The copolyester product had an inherent viscosity of 0.61. Its DSC melting peak was at 228° C., its crystallization peak was 184° C., and its glass transition temperature was 90° C.

The product was subjected to solid state polycondensation according to Example 1. The solid stated copolyester product had an inherent viscosity of 1.04, and a residual acetaldehyde content of 0.09 ppm. The high molecular weight copolyester was heated at 210° C., 230° C., 250° C. for 5 minutes and 10 minutes, and the amount of acetaldehyde gas that was given off was measured in a gas chromatograph. The results were as follows:

| Temperature | Time | ppm of Acetaldehyde |
| --- | --- | --- |
| 210° C. | 5 min | 0.14 |
| 230° C. | 5 min | 0.25 |
| 250° C. | 5 min | 0.66 |
| 210° C. | 10 min | 0.23 |
| 230° C. | 10 min | 0.060 |
| 250° C. | 10 min | 1.90 |

EXAMPLE 4 (2% BSE)

Into a 1-liter stainless steel reactor equipped with a stirrer, nitrogen gas inlet port and a condenser, the following were added:

| 388.4 | g | dimethyl terephthalate |
| --- | --- | --- |
| 272.8 | g | ethylene glycol |
| 13.53 | g | bis(4-β-hydroxyethoxyphenyl)sulfone |
| 0.7685 | g | trimellitic acid anhydride |

-continued

| | |
|---|---|
| 0.1225 g | Mn(OAc)$_2$ . 4H$_2$O |
| 0.1458 g | Sb$_2$O$_3$ |

The reaction mixture was heated, under nitrogen atmosphere, at 200° C. for 3½ hours. Methanol was continuously distilled out during this period. Then 0.082 g H$_3$PO$_3$ was added to the reaction mixture. The reaction temperature was raised to 220° C. After ½ hour, the nitrogen gas flow was stopped, and the reaction was continued at 265° C. for 3 hours, under less than 0.5 mm Hg vacuum. The copolyester product had an inherent viscosity of 0.52. Its DSC melting peak was at 244° C. and its glass transition temperature was 84° C.

The product was ground and solid stated in the same manner as in Example 1. The solid stated copolymer product had an inherent viscosity of 0.73, and a residual acetaldehyde content of 0.12 ppm. The high molecular weight copolyester was heated at 230° C., 250° C. and 270° C. for 5 minutes and 10 minutes, and the amount of acetaldehyde gas that was given off was measured in a gas chromatograph. The results were as follows:

| Temperature | Time | ppm of Acetaldehyde |
|---|---|---|
| 230° C. | 5 min | 0.26 |
| 250° C. | 5 min | 1.20 |
| 270° C. | 5 min | 3.45 |
| 230° C. | 10 min | 0.48 |
| 250° C. | 10 min | 4.85 |
| 270° C. | 10 min | 8.55 |

EXAMPLE 5 (12% BSE)

Into a 1-liter stainless steel reactor equipped with a stirrer, nitrogen gas inlet port and a condenser, the following were added:

| | | |
|---|---|---|
| 388.4 | g | dimethyl terephthalate |
| 248.0 | g | ethylene glycol |
| 81.18 | g | bis(4-β-hydroxyethyoxyphenyl)sulfone |
| 0.1225 | g | Mn(OAc)$_2$ . 4H$_2$O |
| 0.1458 | g | Sb$_2$O$_3$ |

The reaction mixture was heated, under nitrogen atmosphere, at 200° C. for 2 hours and 20 minutes. Methanol was continuously distilled off during this period. Then 0.082 g H$_3$PO$_3$ was added to the reaction mixture. The reaction temperature was raised to 240° C. After 1 hour 35 minutes, the nitrogen gas flow was stopped, and the reaction was continued at 262° C. for 2½ hours, under less than 0.5 mm Hg vacuum. The copolyester product had an inherent viscosity of 0.51. Its DSC melting peak was at 221° C. and a glass transition temperature of 92° C.

The product was ground and crystallized in the same manner as in Example 1. The solid state polycondensation reaction was conducted at 190° C. for 7 hours with nitrogen flow of 700 cc/min. The solid stated copolyester product has an inherent viscosity of 0.68 and a residual acetaldehyde content of 0.20 ppm. The high molecular weight copolyester was heated at 230° C., 250° C., 270° C. for 5 minutes and 10 minutes, and the amount of acetaldehyde gas that was given off was measured in a gas chromatograph. The results were as follows:

| Temperature | Time | ppm Acetaldehyde |
|---|---|---|
| 230° C. | 5 min | 0.44 |
| 250° C. | 5 min | 0.58 |
| 270° C. | 5 min | 1.35 |
| 230° C. | 10 min | 1.05 |
| 250° C. | 10 min | 1.45 |
| 270° C. | 10 min | 4.85 |

EXAMPLE 6 (1% BSE)

Into a 1-liter stainless steel reactor equipped with a stirrer, nitrogen gas inlet port and a condenser, the following were added:

| | | |
|---|---|---|
| 388.4 | g | dimethyl terephthalate |
| 260.4 | g | ethylene glycol |
| 6.76 | g | bis(4-β-hydroxyethyoxyphenyl)sulfone |
| 0.7685 | g | trimellitic acid anhydride |
| 0.1225 | g | Mn(OAc)$_2$ . 4H$_2$O |
| 0.1458 | g | Sb$_2$O$_3$ |

The reaction mixture was heated, under nitrogen atmosphere, at 200° C. for 3¼ hours. Methanol was continuously distilled off during this period. Then 0.082 g H$_3$PO$_3$ was added to the reaction mixture. The reaction temperature was raised to 250° C. After 1 hour 15 minutes, the nitrogen gas glow was stopped, and the reaction was continued at 270° C. for 2 hours 35 minutes, under less than 0.5 mm Hg vacuum. The copolyester product had an inherent viscosity of 0.56. Its DSC melting peak was at 250° C.

The product was ground, crystallized and subjected to solid state polycondensation reaction as described in Example 1. The solid stated copolyester product had an inherent viscosity of 0.83, and a residual acetaldehyde content of 0.06 ppm. The high molecular weight copolyester was heated at 230° C., 250° C., 270° C. for 5 minutes and 10 minutes, and the amount of acetaldehyde gas that was given off was measured in a gas chromatograph. The results were as follows:

| Temperature | Time | ppm of Acetaldehyde |
|---|---|---|
| 230° C. | 5 min | 0.20 |
| 250° C. | 5 min | 1.8 |
| 270° C. | 5 min | 9.9 |
| 230° C. | 10 min | 0.47 |
| 250° C. | 10 min | 16. |
| 270° C. | 10 min | 23. |

EXAMPLE 7 (PET)

Into a 1-liter stainless steel reactor equipped with a stirrer, nitrogen gas inlet port and a condenser, the following were added:

| | | |
|---|---|---|
| 388.4 | g | dimethyl terephthalate |
| 310.0 | g | ethylene glycol |
| 0.1225 | g | Mn(OAc)$_2$ . 4H$_2$O |
| 0.1458 | g | Sb$_2$O$_3$ |

The reaction mixture was heated under nitrogen atmosphere, at 200° C. for 3 hours. Methanol was continuously distilled off during this period. Then 0.082 g of H$_3$PO$_3$ was added to the reaction mixture. The reaction temperature was raised to 245° C. After 1 hour 15 minutes, the nitrogen gas flow was stopped, and the reaction was continued at 270° C. for 2 hours 45 minutes under less than 0.5 mm Hg vacuum. The poly(ethylene terephthalate) (PET) product had an inherent viscosity of 0.57. Its DSC melting peak was at 252° C.

The polyester material was ground, crystallized and subjected to solid state polycondensation reaction as described in Example 1. The reaction temperature was 200° C. and the reaction time was 7 hours. The solid state product had an inherent viscosity of 0.78, and a residual acetaldehyde content of 0.10 ppm. This polyester was heated at 230° C., 250° C., 270° C. for 5 minutes and 10 minutes, and the amount of acetaldehyde gas that was given off was measured in a gas chromatograph. The results were as follows:

| Temperature | Time | ppm of Acetaldehyde |
|---|---|---|
| 230° C. | 5 min | 0.22 |
| 250° C. | 5 min | 1.58 |
| 270° C. | 5 min | 7.95 |
| 230° C. | 10 min | 0.59 |
| 250° C. | 10 min | 12.7 |
| 270° C. | 10 min | 24.0 |

EXAMPLE 8

Using the same apparatus used in Example 1, the following were added:

| 291.3 | g | dimethyl terephthalate |
|---|---|---|
| 232.8 | g | ethylene glycol |
| 47.5 | g | ethoxylated Bisphenol A |
| 0.4078 | g | pentaerythritol |
| 0.0919 | g | Mn(OAc)$_2$ . 4H$_2$O |

The reaction mixture was heated at 190° C. for 2 hours under N$_2$ atmosphere. Methanol was continuously distilled off during this period. Then the following compounds were added to the mixture in the reactor:

| 0.1093 g | Sb$_2$O$_3$ |
|---|---|
| 0.225 g | triphenyl phosphite |
| 0.0894 g | tetrakis[2,4-ditert-butylphenyl] 4,4' biphenylenediphosphonite |

The reaction temperature was increased to 260° C. and maintained for 50 minutes under nitrogen atmosphere. Then the nitrogen gas flow was stopped and a vacuum of less than 0.4 mm Hg was applied. The reaction was continued at 270° C. for 3 hours 50 minutes under vacuum. The copolyester has an inherent viscosity of 0.69. The DSC melting peak was at 225° C. and its glass transition temperature was 76° C.

The copolyester was subjected to solid state polycondensation reaction as described in Example 1. The copolyester solid state product turned light brown in color. The inherent viscosity of the product was not measured because a large amount of insoluble gel was formed. The residual acetaldehyde content was 0.18 ppm.

EXAMPLE 9 (7% BSE)

The melt polymerized copolyester of Example 1 was crystallized inside a vacuum oven at 135° C. for 12 hours. The residual acetaldehyde content was 0.44 ppm. This copolyester was not subjected to solid state polycondensation. It was heated at 230° C., 250° C., 270° C. for 5 minutes and 10 minutes, and the amount of acetaldehyde gas that was given off was measured in a gas chromatograph. The results were as follows:

| Temperature | Time | ppm of Acetaldehyde |
|---|---|---|
| 230° C. | 5 min | 2.35 |
| 250° C. | 5 min | 2.10 |
| 270° C. | 5 min | 4.45 |
| 230° C. | 10 min | 4.85 |
| 250° C. | 10 min | 5.10 |
| 270° C. | 10 min | 9.00 |

EXAMPLE 10 (COMMERCIAL PET)

A solid state PET sample that was obtained from Zimmer A.G. had an inherent viscosity of 0.78 and a residual acetaldehyde content of 0.14 ppm. This sample was heated at 210° C., 230° C., 250° C. and 270° C. for 5 minutes and 10 minutes, and the acetaldehyde gas that was given off was measured in a gas chromatograph. The results were as follows:

| Temperature | Time | ppm of Acetaldehyde |
|---|---|---|
| 210° C. | 5 min | 0.26 |
| 230° C. | 5 min | 0.54 |
| 250° C. | 5 min | 0.30 |
| 270° C. | 5 min | 10.1 |
| 210° C. | 10 min | 0.44 |
| 230° C. | 10 min | 1.45 |
| 250° C. | 10 min | 6.40 |
| 270° C. | 10 min | 19.0 |

EXAMPLE 11 (15% BSE)

Using the same apparatus as described in Example 1, the following were added:

| 291.3 | g | dimethyl terephthalate |
|---|---|---|
| 233.4 | g | ethylene glycol |
| 76.1 | g | bis(4-β-hydroxyethyoxyphenyl)sulfone |
| 0.0919 | g | Mn(OAc)$_2$ . 4H$_2$O |
| 0.2882 | g | trimellitic acid anhydride |

The reaction mixture was heated at 190° C. for 2 hours and at 210° C. for 2 hours under nitrogen atmosphere. Methanol was continuously distilled out during this period. Then the following compounds were added to the mixture in the reactor:

| 0.1093 g | Sb$_2$O$_3$ |
|---|---|
| 0.225 g | triphenylphosphite |
| 0.0894 g | tetrakis[2,4-ditertbutylphenyl] 4,4' biphenylenediphosphonite |

The reaction temperature was increased to 260° C. and maintained for ½ hour under nitrogen atmosphere. Then the nitrogen gas flow was stopped and a vacuum of less than 0.4 mm Hg was applied. This reaction was continued at 275° C. under vacuum for 4 hours and 10 minutes. The copolyester had an inherent viscosity of 0.77. The DSC melting peak was at 215° C. It was crystallized in the vacuum oven at 125° C. for 12 hours. The thermogram from the differential scanning calorimeter showed that there was only slight crystallization. As a result, the copolyester was partially melted when "solid state" polycondensation reaction was attempted under the conditions described in Example 1, but at only 180° C.

EXAMPLE 12

Copolyester prepared from dimethyl terephthalate, ethylene glycol and bis(4-β-hydroxyethoxyphenyl)sulfone by melt polymerization.

291.3 g of dimethyl terephthalate, 233.4 g of ethylene glycol and 0.0919 g of $Mn(OAc)_2.4H_2O$ were charged into a 1-liter stainless steel reactor equipped with a stirrer, nitrogen gas inlet port and a condenser. The reaction mixture was heated to 190° C. for 2 hours, 210° C. for 2 hours under nitrogen atmosphere. Methanol was continuously distilled out during this period. Then 76.1 g of bis(4-β-hydroxyethoxyphenyl)sulfone, 0.1093 g of $Sb_2O_3$, 0.255 g of $(PhO)_3P$ (i.e., triphenyl phosphite) and 0.0894 g of tetrakis[2,4-di-tertiarybutylphenyl]4,4'-biphenylenediphosphonite were added into the reactor. The reaction temperature was raised to 260° C. and maintained for 45 minutes. The nitrogen gas flow was turned off and a vacuum of less than 0.4 mm Hg was applied. The reaction was continued at 275° C. for 4¼ hours. The inherent viscosity of the copolyester was 0.77.

EXAMPLE 13

Poly(ethylene terephthalate) was prepared by melt polymerization as follows:

Into a 500 ml 3-necked round bottom flask, equipped with a nitrogen gas inlet tube, stirrer and a condenser, the following compounds were added:

| 46.5 | g | dimethyl terephthalate |
| 35.4 | g | ethylene glycol |
| 0.0263 | g | zinc acetate dihydrate |
| 0.01398 | g | antimony trioxide |

The contents of the flask was heated at 200° C. under nitrogen atmosphere for 3 hours. During this time, methanol was distilled off. Then the reaction temperature was raised to 280° C., nitrogen flow was stopped and vacuum was gradually applied until less than 0.5 mm Hg. Excess ethylene glycol was continuously distilled off. The reaction was stopped after 4 hours. The inherent viscosity was 0.83, the glass transition temperature was 72° C., and the melting point was 252° C.

As will be evident to those skilled in the art, various modifications of this invention can be made or followed in the light of the foregoing disclosure and discussion without departing from the spirit and scope of the disclosure or from the scope of the claims.

I claim:

1. A thermoplastic copolyester, having an inherent viscosity of over 0.65 dl/gm, a Tg of at least 82° C. and a melting point peak of at least 220° C., which is the solid state polycondensation reaction product of a thermoplastic copolyester which is the polymeric reaction product of reactants consisting essentially of
    (A) reactant(s) selected from terephthalic acid and its $C_1$ to $C_4$ alkyl esters, with
    (B) reactants, bis(4-β-hydroxyethoxyphenyl)sulfone and ethylene glycol,
wherein the amount of said bis(4-β-hydroxyethoxyphenyl)sulfone is 2–12 mol percent of the amount A of reactant(s), the combined amount of B reactants is about 110 to 300 mol percent of the amount of A reactant(s), prepared by melt polymerization to yield a copolyester having a lower inherent viscosity which is in the range 0.2 to 0.7 dl/gm.,
    said solid state copolyester being more resistant to decomposition in the molten state to form acetaldehyde than (1) the same copolyester of the same or lower inherent viscosity but made entirely by polymerization and condensation in the molten state or (2) poly(ethylene terephthalate) made by solid state polycondensation or by melt polymerization.

2. A plastic container made by melt forming a copolyester of claim 1.

3. A product of claim 1 that is crystallized.

4. A product of claim 1 that has a crystalline melting point peak of at least 220° C.

5. A process for making a thermoplastic copolyester which is intrinsically more stable than poly(ethylene terephthalate) toward decomposition to form unwanted products such as acetaldehyde, which comprises
    (1) melt polymerizing reactants consisting essentially of
        (A) reactant(s) selected from terephthalic acid and its $C_1$ to $C_4$ alkyl esters with
        (B) reactants, bis(4-β-hydroxyethoxyphenyl)sulfone and ethylene glycol,
wherein the amount of said bis(4-β-hydroxyethoxyphenyl)sulfone is 2–12 mol percent of the amount A of reactant(s), and the combined amount of B reactants is about 110 to 300 mol percent of the amount of A reactant(s), until the polymeric reaction product has an inherent viscosity of 0.2 to 0.7 dl/gm.,
    (2) cooling the copolyester from step (1) to a solid state, reducing it to particulate form and heat crystallizing the particulate copolyester, and
    .(3) effecting solid state reaction of said particulate copolyester by polycondensation thereof, in a temperature range from 180° C. to just below the temperature of the onset of melting as indicated by a thermogram determined using a differential scanning calorimeter, to a higher inherent viscosity than the product of step (), said higher viscosity being at least 0.65 dl/gm.

6. A product of the process of claim 5 in particulate crystalline form.

7. A process of claim 5, wherein the highest temperature in step (1) is from 260° to 280° C.

8. A process of claim 5 wherein step (3) is effected in the temperature range from 180° C. to a higher temperature below the temperature of the onset of melting or below 224° C., whichever is lower.

9. A process of claim 7 wherein step (3) is effected in the temperature range from 180° C. to a higher temperature below the temperature of the onset of melting or below 224° C., whichever is lower.

10. A process of claim 5 wherein step (3) is effected in the temperature range from 180° C. to a higher temperature at least 5° C. below the temperature of the onset of melting or below 219° C., whichever is lower.

11. A process of claim 7 wherein step (3) is effected in the temperature range from 180° C. to a higher temperature at least 5° C. below the temperature of the onset of melting or below 219° C., whichever is lower.

* * * * *

UNITED STATES PATENT OFFICE
CERTIFICATE OF CORRECTION

PATENT NO. : 4,330,661

DATED : May 18, 1982

INVENTOR(S) : S. W. Go

It is certified that error appears in the above-identified patent and that said Letters Patent are hereby corrected as shown below:

Col. 9, line 63, "has" should be --had--; Col. 14, line 43, after "step", "()" should be --(1)--.

Signed and Sealed this

Twenty-fourth Day of August 1982

[SEAL]

Attest:

GERALD J. MOSSINGHOFF

Attesting Officer          Commissioner of Patents and Trademarks